UNITED STATES PATENT OFFICE.

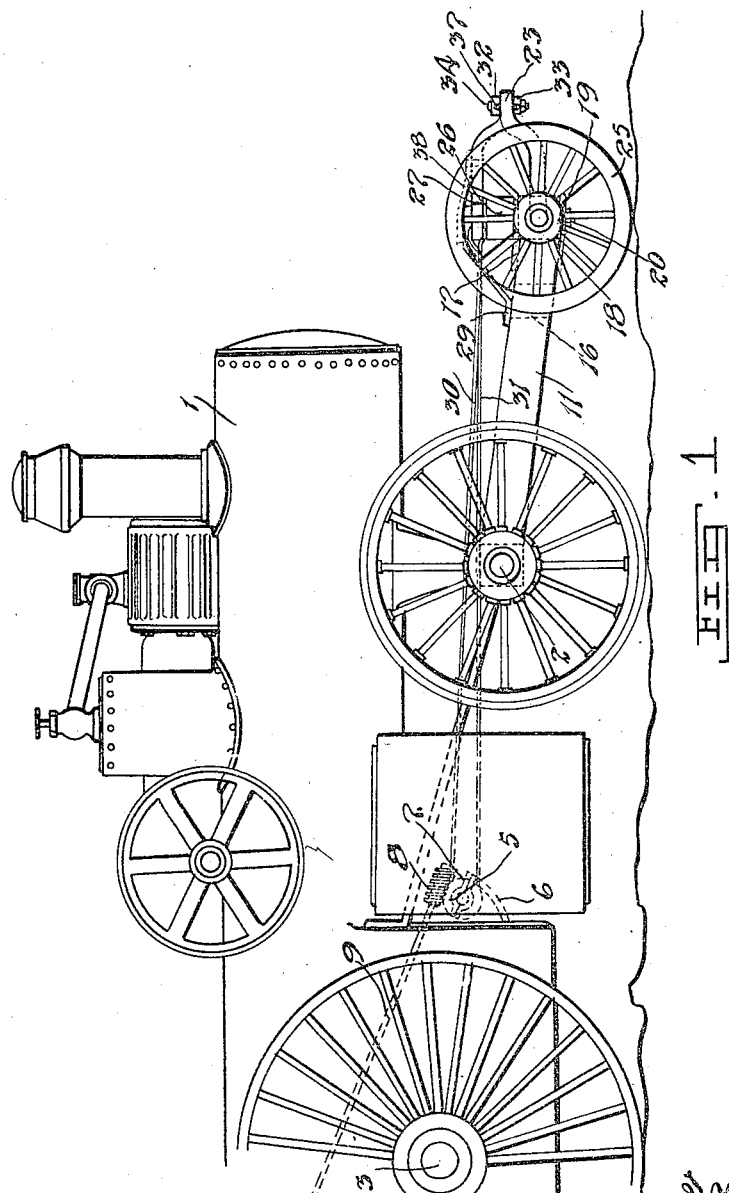

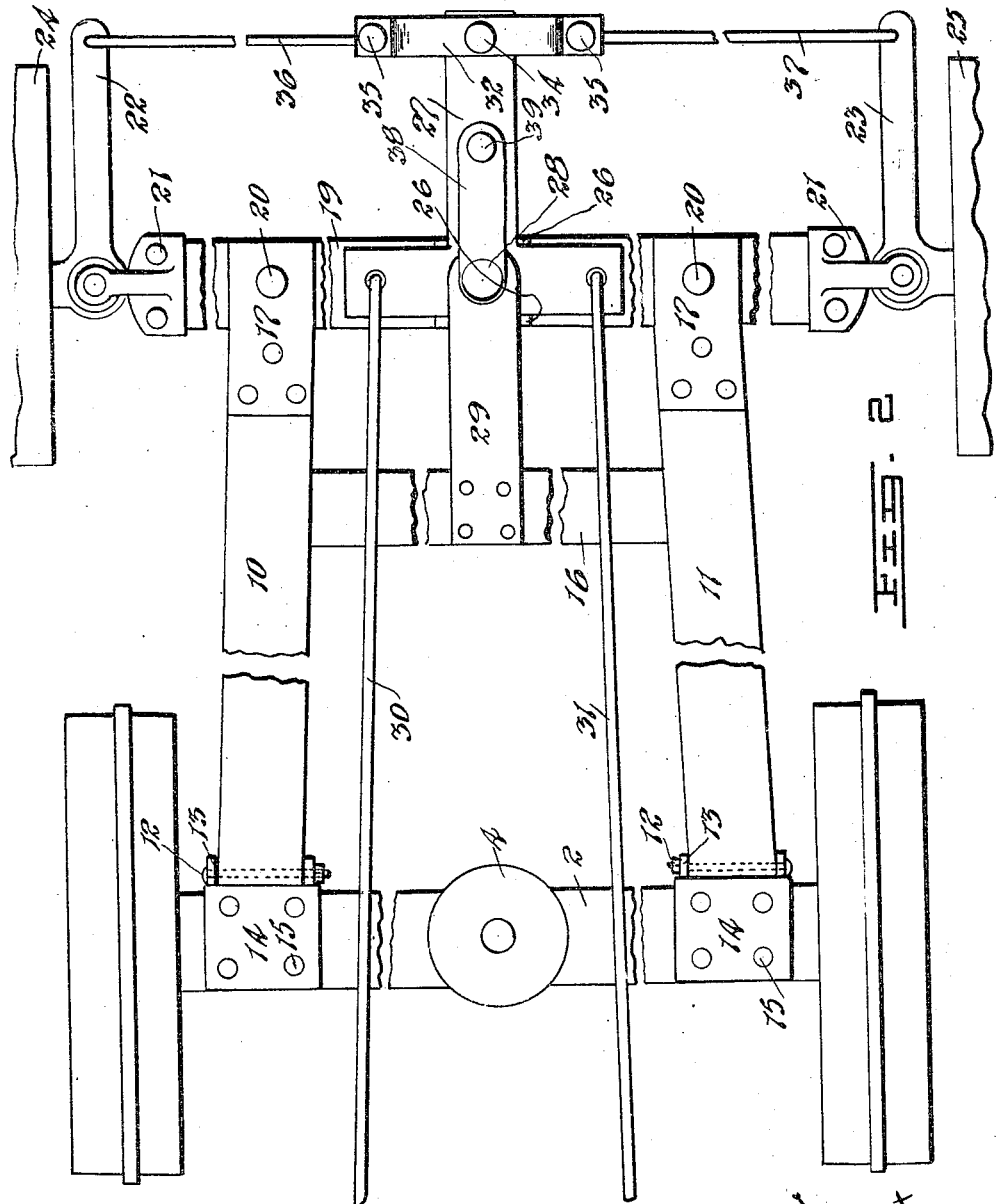

THOMAS HUGHES CUDDY, OF SANDFORD, MANITOBA, CANADA, ASSIGNOR OF ONE-HALF TO MICHAEL JOSEPH RODNEY, OF WINNIPEG, CANADA.

STEERING DEVICE FOR TRACTION-ENGINES.

1,007,541. Specification of Letters Patent. Patented Oct. 31, 1911.

Application filed August 26, 1910. Serial No. 579,162.

*To all whom it may concern:*

Be it known that I, THOMAS HUGHES CUDDY, of the village of Sandford, in the Province of Manitoba, Canada, have invented certain new and useful Improvements in Steering Devices for Traction-Engines, of which the following is the specification.

My invention relates to a steering device for a traction engine or other such machine, and the object of the invention is to provide a simply constructed, durable and efficient device which can be attached to the ordinary traction engine and which will give immediate and complete control to the engine, particularly when it is used for drawing gang plows.

It consists essentially in a frame securable to the front axle of a traction engine, said frame having a forward adjustable end beam, swiveled wheels secured to the end beam, a T-bar swivelly secured centrally to the beam, means connecting the T-bar with the wheels and means passing between the T-bar and the steering drum on the traction engine, the parts being arranged and constructed as hereinafter more particularly described.

Figure 1 is a side elevation of the device as it appears when in use. Fig. 2 is an enlarged detailed plan view of the attachment showing the manner in which it is secured to the front axle of the traction engine.

In the drawings like characters of reference indicate corresponding parts in each figure.

1 represents a traction engine of any approved form having a front axle 2 and a rear axle 3 provided with the usual carriage wheels, it being understood that the front axle is swung on a center pin located at 4 as is customary.

5 represents the ordinary steering drum suitably mounted in brackets 6 secured to the engine. The drum is provided with a worm wheel 7 which engages with a worm 8 carried at the lower end of a steering post 9.

10 and 11 are two similar beams swingably secured to the forward axle 2 by means of pins 12 passing through opposing lugs 13 carried by plates 14, which plates are firmly bolted at 15 to the axle adjoining the wheels.

16 is a cross beam secured to the beams 10 and 11 and 17 and 18 are plates fastened to the extending ends of the said beams, which plates receive the beam 19, said beam being held in a fixed position by removable bolts 20. The beam 19 carries end pieces 21 which provide bearings for bell cranks 22 and 23 carrying guiding wheels 24 and 25. I have not entered into details regarding the formation of these bearings as any approved form can be used which will allow the wheels 24 and 25 to swing at the ends of the beam.

A block 26 is secured centrally to the beam 19 and a T-bar 27 is swivelly secured to the block by means of a pin 28 which pin is held at its upper end by a strap 29 passing rearwardly to the cross beam 16. Cables 30 and 31 pass from the ends of the cross piece of the T-plate backwardly to the drum 5 where they are fastened.

32 and 33 are similar bars pivotally secured to the forward portion of the T-plate by a bolt 34. The bars have their ends connected by pins 35 with links 36 and 37 which pass to the forwardly directed arms of the bell cranks where they are fastened.

According to the above construction it is seen that the wheels 24 and 25 can be completely controlled by the cables 30 and 31 passing to the drum, which drum is directly controlled by the operator on the traction engine in the usual way. If the cable 30 be wound on the drum cable 31 will wind off, so that the T-arm is swung in a direction which will cause the forwardly directed arms of the bell cranks 22 and 23 to swing in a left hand direction. Consequently the front axle 2 of the engine is swung in a left hand direction.

I am aware that devices provided with guiding wheels have been constructed to turn the front axle of a traction engine, but have found that such devices are more or less impractical for the reason that the guiding wheel is located too far ahead of the engine with the result that it cannot turn quickly when desired. With my device the guiding wheels can be located very close to the front axle so that the engine can be turned very quickly. Further as there are two guide wheels supplied with the attachment there is no trouble in holding it in the furrow when plows are being drawn. The bolts 20 allow the beam 19 to be moved endwise so that the distance of the engine from the furrow can be adjusted.

In order to prevent the forward end of the T plate from sagging I have supplied the strap 38 which passes from the pin 28 to a pin 39 extending from the T-plate. The action of this will readily be understood.

What I claim as my invention is:

1. The combination with the front axle of a traction engine, and a steering drum carried by the engine, of a set of forwardly extending beams swingably secured to the forward axle, a cross beam secured to the forward end of the latter beams, guide wheels swivelly secured to the ends of the cross beam, a T-plate pivotally fastened to the cross beam, means connecting the T plate with the guide wheels, and means controlled by the drum for swinging the plate as and for the purpose specified.

2. The combination with the front axle of a traction engine, and a steering drum carried by the engine, of a set of beams swingably secured to the front axle, a cross beam secured to the forward ends of the latter beams, bell cranks pivotally secured to the ends of the cross beam and carrying guide wheels, a T plate pivotally secured to the cross beam, cables uniting the opposite ends of the T plate to the drum and means connecting the T plate with the bell cranks, as and for the purpose specified.

3. The combination with the front axle of a traction engine, and a steering drum carried by the engine, of a set of beams swingably secured to the front axle, a cross beam secured to the latter beams by bolts, bell cranks forming axles for a set of guide wheels, a T plate pivotally secured to the cross beam, cables passing backwardly to the drum from the opposite ends of the T plate bars pivotally secured to the forward end of the T plate and links connecting the bars to the bell cranks, as and for the purpose specified.

Signed at Winnipeg, in the Province of Manitoba, this 29th day of June, 1910.

THOMAS HUGHES CUDDY.

In the presence of—
G. S. ROXBURGH,
R. FOSTER.